(12) United States Patent
Mecfel-Marczewski et al.

(10) Patent No.: US 8,853,322 B2
(45) Date of Patent: Oct. 7, 2014

(54) WATER DISPERSABLE, CYCLIC-CARBONATE-FUNCTIONALIZED VINYL COPOLYMER SYSTEM

(75) Inventors: Joanna Mecfel-Marczewski, Tacherting (DE); Burkhard Walther, Garching (DE); Jochen Mezger, Lautersheim (DE); Rosita Staudhamer, Ampfing (DE)

(73) Assignee: Construction Research & Technology GmbH, Trostberg (DE)

( * ) Notice: Subject to any disclaimer, the term of this patent is extended or adjusted under 35 U.S.C. 154(b) by 176 days.

(21) Appl. No.: 13/497,357

(22) PCT Filed: Aug. 12, 2010

(86) PCT No.: PCT/EP2010/061756
§ 371 (c)(1),
(2), (4) Date: Jun. 19, 2012

(87) PCT Pub. No.: WO2011/035982
PCT Pub. Date: Mar. 31, 2011

(65) Prior Publication Data
US 2012/0316286 A1    Dec. 13, 2012

(30) Foreign Application Priority Data
Sep. 25, 2009    (EP) .................................... 09171362

(51) Int. Cl.
| | | |
|---|---|---|
| *C08F 220/28* | (2006.01) | |
| *C08F 220/34* | (2006.01) | |
| *C08F 220/38* | (2006.01) | |
| *C08L 33/14* | (2006.01) | |
| *C08F 220/18* | (2006.01) | |
| *C08F 220/60* | (2006.01) | |
| *C08F 220/14* | (2006.01) | |

(52) U.S. Cl.
CPC ............. C08F 220/28 (2013.01); C08F 220/18 (2013.01); *C08F 220/14* (2013.01); C08F 220/60 (2013.01)

USPC ........... 524/558; 524/548; 524/555; 526/287; 526/321; 526/328.5

(58) Field of Classification Search
CPC ............ C08F 2/24; C08F 2/26; C08F 224/00; C08F 230/02; C08F 220/02
USPC ......................................................... 526/269
See application file for complete search history.

(56) References Cited

U.S. PATENT DOCUMENTS 4,544,726 A * 10/1985 Alford et al. ................... 526/309
5,827,928 A    10/1998 Morimoto et al.
6,841,655 B1 * 1/2005 Gota et al. ..................... 528/425

FOREIGN PATENT DOCUMENTS

| EP | 0 737 726 A1 | 10/1996 | |
|---|---|---|---|
| JP | 09-278982 | 10/1997 | |
| JP | 2003-327854 | 11/2003 | |
| WO | WO 97/23516 | 7/1997 | |
| WO | WO 9723516 A1 * | 7/1997 | ................ C08F 8/32 |

OTHER PUBLICATIONS

PCI Paint & Coatings Industry, vol. 29, No. 9, Sep. 2013, pp. 72 & 73.*
PCT/EP2010/061756—International Search Report, Nov. 16, 2010.
PCT/EP2010/061756—International Written Opinion, Nov. 16, 2010.
PCT/EP2010/061756—International Preliminary Report on Patentability, Apr. 3, 2012.

* cited by examiner

*Primary Examiner* — Vu A Nguyen
(74) *Attorney, Agent, or Firm* — Curatolo Sidoti Co., LPA; Joseph G. Curatolo; Salvatore A. Sidio

(57) ABSTRACT

A water-dispersible, cyclocarbonate-functionalized vinyl copolymer binder, a process for the preparation of the binder, an aqueous dispersion containing the binder, a system comprising the binder, water and an (amine) curing agent and the use of the binder for the production of a hardened coating are proposed. It was surprisingly found that this binder, in which the emulsifier groups according to the invention are incorporated in the polymer chain, gives stable aqueous dispersions having a solids content of up to a 30% by weight.

25 Claims, No Drawings

WATER DISPERSABLE, CYCLIC-CARBONATE-FUNCTIONALIZED VINYL COPOLYMER SYSTEM

CROSS REFERENCE TO RELATED APPLICATIONS

This application is a national stage application of International Application No. PCT/EP2010/061756, filed 12 Aug. 2010, which claims priority from European Patent Application Serial No. 09171362.8, filed 25 Sep. 2009, from which applications priority is claimed, and which are incorporated herein by reference.

The present invention relates to a water-dispersible, cyclocarbonate-functionalized vinyl copolymer binder, a process for the preparation of the binder, an aqueous dispersion containing the binder, a system comprising the binder, water and a curing agent and the use of the binder for the production of a hardened coating.

Two-component systems based on polyisocyanates are part of the prior art. These are used, for example, as adhesives, sealants, joint filling compounds, for corrosion protection and for coatings. The high acid, alkali and chemical resistance of the hardened compositions thus obtained are advantageous. However, NCO groups are sensitive to moisture. The preparation of storage-stable, water-based systems based on isocyanates is therefore not possible. Furthermore, monomeric and low molecular weight isocyanate compounds are toxicologically unsafe, in particular if they are readily volatile or migrate.

Polyurethanes can also be obtained starting from cyclic carbonate compounds. It is known that the polymerization of vinyl compounds which carry cyclic carbonate groups is greatly accelerated compared with the correspondingly unsubstituted vinyl compounds, owing to intramolecular and intermolecular effects of these groups (*Macromolecules*, 2008, 9035-9043). Cyclic carbonate compounds are moreover crosslinkable by amines.

For the preparation of water-based systems, sufficient dispersibility of the binders in water is required. To achieve this, there has been a changeover to incorporating the required emulsifiers chemically into the chain of the binder in order to obtain molecular dispersibility of the binder.

WO 97/23516 A1 describes an aqueous, crosslinkable coating composition comprising a polymer system which is crosslinkable by a process which comprises the reaction of a cyclic carbonate group with an amine group. The water dispersibility is achieved with the aid of carboxylate groups. The amine groups are introduced by reacting carboxylate groups with aziridines. The cyclic carbonate groups and the amine groups may be bonded to the same or to different polymer chains. Vinyl addition polymers, including (meth)acrylate polymers and polyurethanes, may be mentioned as the polymer systems.

However, the curing of this one-component system is effected at elevated temperatures and over relatively long periods at room temperature. Aziridines, are as a rule toxic and carcinogenic. Moreover, carboxylate groups have a high pH in aqueous solution, which may have an adverse effect on the stability to hydrolysis and hence the storage stability of the aqueous dispersions.

JP 09 278982 A describes a curable resin composition which comprises at least one vinyl polymer containing carbonate groups, a polysiloxane having an OH group or hydrolysable group attached to the Si atom, and a curing catalyst. Although JP 09 278982 A associates vinyl polymers containing linear carbonate groups with vinyl polymers containing cyclic carbonate groups, it rapidly becomes clear from paragraph of said patent application that the systems in question are two alternative embodiments of the vinyl polymer containing carbonate groups.

EP 0 737 726 A1 mentions, in Tab. 1, glycerol carbonate methacrylate esters in combination with other (meth)acrylate monomers and vinyl monomers, but without an emulsifier component.

It was the object of the present invention substantially to overcome at least some of the disadvantages of the abovementioned prior art. In particular, it was intended to provide a water-based vinyl copolymer binder without NCO groups and without the use of aziridines in the preparation process, which gives curable stable aqueous dispersions having high solids contents. The storage stability of the aqueous dispersions should meet commercial requirements. The dispersions should require no organic solvents or additional emulsifiers. The binder should be easy to prepare and to use.

These objects are achieved by the features of the independent claims. The dependent claims relate to preferred embodiments.

It was surprisingly found that a vinyl copolymer binder having cyclic carbonate groups which are incorporated in the polymer chain and in which the emulsifier groups according to the invention are likewise incorporated in the polymer chain gives stable aqueous dispersions having a solids content of up to 30% by weight.

The present invention relates to a water-dispersible, cyclocarbonate-functionalized vinyl copolymer binder having structural groups which are derived from i) at least one vinyl monomer (I) having at least one cyclic carbonate group, ii) at least one vinyl monomer (II) having at least one emulsifier group and iii) optionally at least one copolymerizable vinyl monomer (III) which differs from the monomers (I) and (II).

For the purposes of the present invention, "vinyl monomer" is to be understood as meaning an ethylenically unsaturated compound. "Vinyl monomers" therefore also comprise allyl monomers, acrylates and methacrylates. The statement that the structural groups are derived from the corresponding monomers comprises the possibility that the corresponding monomers are copolymerized but also comprises the possibility that the corresponding structural groups are obtained only by chemical modification after a polymerization reaction.

The cyclic carbonate group is in particular a 5- or 6-membered ring, preferably a 2-oxo-1,3-dioxolane ring.

A preferred vinyl monomer (I) is a compound of the following formula, namely

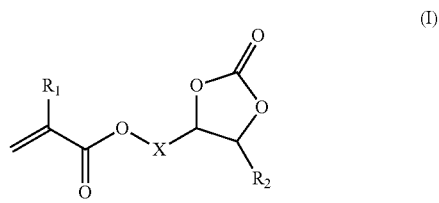

in which $R_1$ is H or $CH_3$;

$R_2$ is H, alkyl, aryl, aralkyl or alkaryl, preferably H, $C_{1-8}$ alkyl, $C_{6-14}$-aryl, $C_{7-20}$-aralkyl or -alkaryl, and in particular is H;

X is alkylene, arylene, aralkylene or alkarylene, which optionally contain (poly)ester, (poly)ether, (poly)amide, (poly)urethane and/or (poly)carbonate groups, preferably $C_{1-8}$-alkylene, in particular methylene.

The vinyl monomer (I) is accordingly a (meth)acrylate. The designation "(meth)acrylic acid" takes into account the condition $R_1$=H or $CH_3$, i.e. it may be either acrylic acid or methacrylic acid. The designation "(poly)ester groups" and the like means that either one ester group or a plurality of ester groups may be present in the group "X". A particularly preferred representative of the vinyl monomer (I) is glyceryl carbonate acrylate.

The vinyl monomer (I) preferably has a molecular weight of 172 (in the case of glyceryl carbonate acrylate) to about 1500. In the context of the present invention, molecular weight data are based on the unit [g/mol], even if this is not specified in the individual case.

The emulsifier group present in the vinyl monomer (II) is a nonionic or an ionic group. The vinyl monomer (II) preferably has a molecular weight of 88 (in the case of ethylene glycol monovinyl ether) to about 1500.

The water dispersibility of the vinyl copolymer binder can be achieved with nonionic groups based on diols or (poly)alkylene glycols. Here, "diol" is to be understood as meaning an alkylene group which carries altogether two OH groups in any desired position. In comparison, an "alkylene glycol" is understood as meaning a vicinal diol (preferably ethylene and propylene glycol and mixtures thereof). The expression "(poly)" is intended to designate monomers, oligomers and polymers.

In the case of the nonionic emulsifier group, the vinyl monomer (II) is accordingly selected from vinyl ethers, allyl ethers, isoprenyl ethers and (meth)acrylates of diols, preferably $C_{2-8}$-diols, or from (poly)alkylene glycols and mixtures thereof, it being possible for the terminal OH groups to be substituted in each case by $C_{1-8}$-alkoxy groups and for the diol and (poly)alkylene glycol radicals to have in each case (poly)ester groups in the chain. Examples comprise (poly)ethylene glycol (meth)acrylates, (poly)caprolactone (meth)acrylates, 4-hydroxybutyl vinyl ether, ethylene glycol vinyl ether, methyl(poly)ethylene glycol (meth)acrylates, (meth)acrylic acid $\Omega$-hydroxy-$(C_{12-24})$-fatty alcohol esters $(C_{2-3})$ (poly)alkoxylates and the like.

The water dispersibility of the vinyl copolymer binder is preferably achieved with ionic groups, the ionic emulsifier group comprising a sulphate, sulphonate, phosphate and/or phosphonate groups. The ionic emulsifier group may also comprise a quaternary ammonium group.

Examples of suitable vinyl monomers (II) having ionic groups are, inter alia, compounds of the general formula (IV):

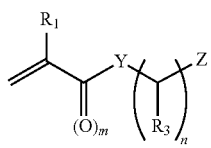

(IV)

in which $R_1$ has the abovementioned meaning, i.e. is H or $CH_3$;

$R_3$ is H, alkyl, aryl, aralkyl or alkaryl, preferably H, $C_{1-8}$-alkyl, $C_{6-14}$-aryl, $C_{7-20}$-aralkyl or -alkaryl, particularly preferably $CH_3$ or H, and in particular is H;

Y is O, $CH_2$, $CH_2O$, NH or $CH_2NH$;

Z is $OSO_3^{(-)}$, $SO_3^{(-)}$, $OPO_3^{(2-)}$, $OPO_3H^{(-)}$, $PO_3^{(2-)}$, $PO_3H^{(-)}$ or $N(CH_3)_3^{(+)}$, in particular $SO_3^{(-)}$ and $N(CH_3)_3^{(+)}$;

M is 0 or 1; and n is 0 to 10.

In the case of the sulphate, sulphonate, phosphate and/or phosphonate groups, suitable counterions are, for example, alkali metal ions, alkaline earth metal ions and/or ammonium ions; in the case of the quaternary ammonium group, for example, halide ions. However, the quaternary ammonium group can itself also be the counterion to the anionic emulsifier group, so that the emulsifier group may also be present as a zwitterionic group, as mentioned below.

Suitable vinyl monomers (II) having ionic groups are, inter alia, also the Ralu®MER products from Raschig, such as, for example, the 3-sulphopropyl (meth)acrylates, the N,N-dimethyl-N-(2-(meth)acryloyloxyethyl)-N-(3-sulphopropyl) ammonium betaines, the polyethylene glycol allyl-(3-sulphopropyl) diether salts, the 3-(meth)acrylamidopropyltrimethylammonium halides, the 1-(3-sulphopropyl)-2-vinylpyridinium and 1-(3-sulphopropyl)-4-vinylpyridinium betaines, but also vinyl phosphonates and vinyl sulphonate, N,N-dimethyl-N-(2-(meth)acryloyloxyethyl)-N-(2-sulphoethyl)ammonium betaine from BASF SE, and 2-acrylamido-2-methylpropanesulphonic acid (AMPS®) from Lubrizol.

In the case of anionic emulsifier groups, the vinyl monomer (II) may be used as a salt or as the free acid, in the case of the free acid neutralization subsequently being effected in aqueous solution with a preferably stoichiometric amount of base (in the case of phosphate or phosphonate groups, preferably only to the monohydrogen phosphate or monohydrogen phosphonate stage).

The copolymerizable vinyl monomer (III) is selected from conjugated dienes, vinylaromatics, vinyl halides, vinyl esters and vinyl ethers, heterocyclic vinyl compounds, (meth)acrylates, (meth)acrylic acid, (meth)acrylamide, (meth)acrylonitrile, esters of monoethylenically unsaturated dicarboxylic acids and mixtures thereof, preferably from $C_{1-8}$-alkyl (meth)acrylates, $C_{6-14}$-aryl (meth)acrylates, $C_{7-20}$-aralkyl (meth)acrylates and styrene. It preferably has a molecular weight of about 50 to about 1000.

The binder according to the invention expediently has an average molecular weight ($M_n$) of 260 to 2 000 000, preferably of 2000 to 1 000 000 and in particular of 5000 to 500 000.

The binder according to the invention is preferably a random copolymer. The percentage composition of the binder, based on the individual structural groups, can be varied within wide limits, the binder molecule of course containing on average at least one structural group derived from monomer (I) and one structural group derived from monomer (II). It preferably comprises 3 to 96 mol % of structural groups which are derived from monomer (I), 3 to 96 mol % of structural groups which are derived from monomer (II) and 0 to 96 mol % of structural groups which are derived from monomer (III).

The binder according to the invention ought to comprise at least 5% by weight, preferably at least 10% by weight and in particular at least 20% by weight of structural groups which are derived from monomer (II), in order to exhibit sufficient dispersibility in water.

Substantially no carboxylate groups are present in the binder according to the invention, preferably not more than 5 mol %, particularly preferably not more than 1 mol % and in particular not more than 0.5 mol % of carboxylate groups.

Furthermore, the monomers (II) and (III) contain substantially no groups reactive with cyclic carbonate groups, preferably not more than 5 mol % and in particular not more than 1 mol % of reactive groups.

The present invention furthermore relates to a process for the preparation of the binder according to the invention. A process preferred according to the invention is based on the free radical copolymerization of the monomers (I), (II) and optionally (III). For this purpose, a mixture of the monomers, optionally together with a free radical initiator, is added dropwise to a boiling solvent, whereupon the solvent is distilled off, the binder obtained is transferred to the aqueous phase and ionizable emulsifier groups are converted into the ionic form.

A particular advantage here is the abovementioned easy (co)polymerizability of vinyl monomers which contain cyclic carbonate groups. The free radical copolymerization is preferably effected in a so-called "starved feed reactor".

Alternatively, a mixture of the monomers, optionally together with a water-soluble free-radical initiator, can be copolymerized directly in (hot) water. This leads directly to an aqueous dispersion according to the invention.

The present invention furthermore relates to an aqueous dispersion which comprises at least one binder according to the invention and water. It is possible to prepare aqueous dispersions having a solids content of at least 10% by weight, preferably at least 20% by weight and in particular at least 30% by weight.

The particle size of the binder dispersed in water is of the order of magnitude of ≤100 nm. A "core-shell" structure of the individual droplets is used as a starting point, the ionic groups and presumably also the cyclic carbonate groups being arranged in the outer regions of the droplets.

A substantial advantage over binders according to the prior art which are dispersed with carboxylate groups is that the ionic emulsifier groups according to the invention, such as, for example, sulphonate or hydrogen phosphonate groups, are less alkaline than carboxylate groups. A slower hydrolysis of the cyclic carbonate groups therefore takes place in aqueous dispersion, which has an advantageous effect on the storability of these dispersions. Thus, the stability of the 30% strength by weight aqueous dispersions of the binder is typically at least one year.

Owing to the more complete dissociation and the higher charge density, for example of the sulphonate group, it is possible to obtain more stable dispersions with less emulsifier, which represents a further advantage of the binders according to the invention.

The present invention furthermore relates to a system which comprises at least one binder according to the invention, water and at least one curing agent, and optionally catalysts, additives and/or auxiliaries.

The curing agent is preferably an amine. Owing to the high reactivity of the cyclic carbonate groups with amine groups, the system according to the invention is expediently formulated as a two-component system in which the binder component and water preferably represent one component and the curing agent preferably represents the other component.

The system according to the invention therefore comprises not only the binder component and water but also preferably an amine component (or a mixture of two or more such amine components) which has at least one $HNR_3R_4$ group, in which $R_3$ and $R_4$, independently of one another, are H, aliphatic, aromatic, aliphatic-aromatic, cycloaliphatic or heterocyclic groups, preferably H, $C_{1-8}$-alkyl, $C_{6-14}$-aryl, $C_{7-20}$-aralkyl or -alkaryl or $C_{5-8}$-cycloalkyl, in which $R_3$ and $R_4$ are not simultaneously H, and $R_3$ and $R_4$ together may form a cycloaliphatic system, preferably a 5-8-membered ring.

The molar ratio of the cyclic carbonate groups to the $HNR_3R_4$ groups is expediently 20:1 to 0.2:1, preferably 10:1 to 0.4:1, particularly preferably 5:1 to 0.5:1 and in particular 2:1 to 0.5:1.

The amine component may have a low molecular weight or a high molecular weight. The average molecular weight ($M_n$) of a low molecular weight amine component is expediently 45 (in the case of ethylamine) to about 1000, in particular 60 to 300. The upper limit of the molecular weight of a high molecular weight amine component is about 5 000 000 and the lower limit about 1000. Preferably, a high molecular weight amine component has an average molecular weight ($M_n$) of 800 to 2 000 000, in particular of 1000 to 1 000 000.

Monofunctional amines are suitable for the reaction of excess cyclic carbonate groups, while di- or polyfunctional amines are suitable for the crosslinking of the binder component. The amine component may be either linear or branched. The skeleton of the amine component may contain aliphatic, aromatic, aliphatic-aromatic, cycloaliphatic and heterocyclic structures. The amine function itself is aliphatic, i.e. the amine nitrogen is not part of an aromatic ring.

Preferred monofunctional amines are low molecular weight primary and secondary alkylamines, arylamines, aralkylamines, alkarylamines and cycloalkylamines.

Preferred difunctional amines are alkylenediamines and/or cycloalkylenediamines, such as, for example, diaminoethane, diaminopropane, diaminobutane, diaminopentane, diaminohexane, diaminocyclopentane, diaminocyclohexane, diaminocycloheptane, isophoronediamine and the like. Isophoronediamine has the additional advantage of the different reactivities of the two amine groups, which can be utilized for prolonging the pot lives.

Preferred polyfunctional amines are amino functionalized polyalkylene glycols, such as, for example, the Jeffamines® from Huntsman Corp., e.g. the Jeffamines D-230, D-400, D-2000, D-4000, T-403, T-3000, T-5000, ED-600, ED-2003, or amines of the general formula $H_2N-(CH_2CH_2-NH)_o-CH_2CH_2-NH_2$, where o=1 to 10, such as, for example, diethylenetriamine. Polymers which are selected from polyamines, dendritic polyamines, polyimines (such as, for example, the polyethyleneimines of the Lupasol® type from BASF SE), polyamides, polyaminoamides, polyurethanes, polyvinylamines or mixtures thereof are preferred as the high molecular weight amine component.

A particular advantage is that no organic (co)solvent or "coalescent" is required in the system according to the invention. The system according to the invention can be formulated exclusively on the basis of water; small amounts of a compatible inert solvent would certainly not present problems but should be avoided in view of health aspects, the environment and workplace safety. For this reason, the amine component is preferably liquid and/or sufficiently water-soluble so that the use of organic solvents can be dispensed with and easy miscibility of the components can nevertheless be achieved.

In a preferred embodiment, the system according to the invention comprises a catalyst for accelerating the reaction of the cyclic carbonate groups with the amine groups. This is expediently a catalytically active amount of a base, such as, for example, of an alkali metal hydroxide. The catalyst may be present in the dispersion of the binder component or in the amine component.

The system according to the invention optionally also comprises additives and/or auxiliaries known per se. These may be present in the dispersion of the binder component or in the amine component or may be added only after the mixing of the two components. Expediently used additives are salts, such as, for example, magnesium chloride, calcium chloride, calcium sulphate, barium sulphate; anhydrite, gypsum, chalk; oxides, such as, for example, silica, alumina; hydroxides, such as, for example, magnesium hydroxide, aluminium hydroxide; coloured pigments, such as, for example, titanium dioxide, iron oxide; carbon, such as, for example, carbon black, graphite, exfoliated graphite; metal pigments, such as, for example, aluminium; water-absorbing fillers, such as, for example, cement; aluminosilicates, such as, for example, talc, kaolin and the like. Auxiliaries which may be used are the customary plasticizers, stabilizers, UV absorbers, antioxidants, antifoams, wetting additives and the like.

The present invention furthermore relates to the use of the binder according to the invention for the production of a hardened coating, in particular to the use as an aqueous adhesive, decorated coating, interior or exterior coating, floor coating, corrosion protection, "topcoats", "basecoats", also in thick layers.

The curing of the system is effected after mixing of the components by the reaction of the amine groups with the cyclic carbonate groups. The pot life is of the order of magnitude of a few minutes to several hours, preferably in the range of about half an hour to about one hour. The curing takes place at 0° C. to 50° C., preferably at 10° C. to 40° C. and in particular at room temperature. The system has preferably dried after only half an hour and has cured with blocking resistance after 24 hours at the most.

The present invention is now illustrated in more detail with reference to the following examples:

EXAMPLES

Preparation Example 1

7.0 g of benzyl methacrylate, 1.0 g of glyceryl carbonate acrylate, 2.0 g of 3-acrylamidopropyltrimethylammonium chloride (emulsifier), 1.0 g of dibenzoyl peroxide (initiator) and 15 ml of methoxypropanol were mixed and stirred until a homogeneous mixture formed. 30 ml of methoxypropanol were refluxed in a 250 ml flask. The homogeneous mixture was added dropwise thereto at a rate of 10 ml/h. Refluxing was then continued for 15 minutes. The methoxypropanol was then distilled off. The polymer formed was dissolved in 40 ml of acetone. 20 ml of water were added to this solution. The acetone was distilled off from this mixture. The aqueous dispersion thus formed had a solids content of 30% by weight.

Preparation Example 2

4.0 g of benzyl methacrylate, 3.0 g of methyl methacrylate, 1.0 g of glyceryl carbonate acrylate, 2.0 g of 3-acrylamidopropyltrimethylammonium chloride (emulsifier), 1.0 g of dibenzoyl peroxide (initiator) and 15 ml of methoxypropanol were mixed and stirred until a homogeneous mixture formed. 30 ml of methoxypropanol were refluxed in a 250 ml flask. The homogeneous mixture was added dropwise thereto at a rate of 10 ml/h. Refluxing was then continued for 15 minutes. The methoxypropanol was then distilled off. The polymer formed was dissolved in 40 ml of acetone. 20 ml of water were added to this solution. The acetone was distilled off from this mixture. The aqueous dispersion thus formed had a solids content of 30% by weight.

Preparation Example 3

3.0 g of benzyl methacrylate, 3.0 g of methyl methacrylate, 1.0 g of acrylic acid, 1.0 g of glyceryl carbonate acrylate, 2.0 g of 3-acrylamidopropyltrimethylammonium chloride (emulsifier), 1.0 g of dibenzoyl peroxide (initiator) and 15 ml of methoxypropanol were mixed and stirred until a homogeneous mixture formed. 30 ml of methoxypropanol were refluxed in a 250 ml flask. The homogeneous mixture was added dropwise thereto at a rate of 10 ml/h. Refluxing was then continued for 15 minutes. The methoxypropanol was then distilled off. The polymer formed was dissolved in 40 ml of acetone. 20 ml of water were added to this solution. The acetone was distilled off from this mixture. The aqueous dispersion thus formed had a solids content of 30% by weight.

Preparation Example 4

3.0 g of benzyl methacrylate, 3.0 g of methyl methacrylate, 2.0 g of glyceryl carbonate acrylate, 2.0 g of 3-acrylamidopropyltrimethylammonium chloride (emulsifier), 1.0 g of dibenzoyl peroxide (initiator) and 15 ml of methoxypropanol were mixed and stirred until a homogeneous mixture formed. 30 ml of methoxypropanol were refluxed in a 250 ml flask. The homogeneous mixture was added dropwise thereto at a rate of 10 ml/h. Refluxing was then continued for 15 minutes. The methoxypropanol was then distilled off. The polymer formed was dissolved in 40 ml of acetone. 20 ml of water were added to this solution. The acetone was distilled off from this mixture. The aqueous dispersion thus formed had a solids content of 30% by weight.

Preparation Examples 5-6

Preparation Examples 3 and 4 were repeated with substantially the same results, 3-sulphopropyl acrylate potassium salt (Ralu®MER SPA) being used as the emulsifier component.

Preparation Example 7

1.0 g of potassium 3-sulphopropyl methacrylate (Ralu®MER SPM) was dissolved in 20 g of 1-methoxy-2-propanol and 1.0 g of water. This solution was admixed, with stirring, with benzyl methacrylate (4.5 g), methyl methacrylate (4.0 g), glyceryl carbonate acrylate (1.0 g) and dibenzoyl peroxide (1.0 g). The resulting solution was added dropwise over a period of about 4 hours into 15 g of boiling 1-methoxy-2-propanol. The mixture was left with stirring at boiling temperature for a further half an hour. The solvent was then distilled off under reduced pressure. Cooling to room temperature gave a light-yellow solid of minimal turbidity. Final mass: 10.4 g. The residue was dissolved in 40 ml of acetone; then 20 g of water were mixed in, in portions. On a rotary evaporator, the acetone was removed completely. Cooling to room temperature left a stable, white dispersion of low viscosity. Final mass: 30.3 g, solid contents: 31.74% by weight, molecular weight (Mn): 1100 g/mol, PDI: 1.8 (THF-GPC).

Preparation Example 8 a) boiling 1-methoxy-2-propanol (20 g) was admixed in metered form with a mixture of benzyl methacrylate (2.0 g), methyl methacrylate (4.0 g), glyceryl carbonate acrylate (2.0 g), 3-methacrylamidopropyltrimethylammonium chloride ("Dimapaquat"; 2.0 g), dibenzoyl peroxide (1.0 g) and 15 g of 1-methoxy-2-propanol, with stirring, at about 10 ml/h. This was followed by boiling at reflux for half an hour more (a total of about 3.5 hours). The solvent was then distilled off completely on a rotary evaporator. This gave 9.9 g of a dark-yellow to light-orange, slightly turbid liquid (solid at room temperature). The residue was dissolved in 40 ml of acetone.

20 g of water were mixed in, in portions, with swirling. The acetone was removed completely on a rotary evaporator; the product was cooled to room temperature. This gave 29.8 g of a turbid, orange dispersion which is stable even at room temperature. (The dispersion remained stable even after a number of days of storage at room temperature.)

b) Batch a) was repeated without 3-methacrylamidopropyltrimethylammonium chloride. This gave 8.8 g of a yellow to light-orange, slightly turbid liquid, which became solid at room temperature. The residue was dissolved in 40 ml of acetone. 20 g of water were mixed in, in portions, with stirring, and a white precipitate was formed. The acetone was removed completely on a rotary evaporator and the product was cooled to room temperature. This gave 28.5 g of a two-phase mixture having a white to light-yellow, turbid lower phase which is of high viscosity and is solid at RT, and a clear upper water phase.

c) Batch a) or b) was repeated, with 2.0 g of 3-methacrylamidopropyltrimethylammonium chloride being added only after dissolution in acetone. This 3-methacrylamidopropyltrimethylammonium chloride, however, did not dissolve, but instead settled out as a lower phase. 20 g of water were mixed in, in portions, with swirling. After about 25 minutes there were still 2 phases visible (upper, whitish, slightly turbid phase, and yellowish, highly viscous lower phase). The acetone was removed completely on a rotary evaporator and the product was cooled to room temperature. This gave 28.7 g of a two-phase mixture with a white to light-yellow, turbid lower phase which is of high viscosity and is solid at RT, and a clear upper water phase.

Batches a), b) and c) show clearly that the emulsifier component must be incorporated by copolymerization into the polymer in order to develop its emulsifying effect. An identical amount of emulsifier component not incorporated by copolymerization into the polymer shows no effect.

d) Batch a) was repeated with only 1.0 g (i.e. about 10% by weight) of 3-methacrylamidopropyltrimethylammonium chloride. Here again, stable aqueous dispersions were obtained, although the results were difficult to reproduce.

Use Example 1

0.25 g of a silicone antifoam (BYK-028 from Byk-Chemie GmbH), 0.5 g of a silicone-based wetting additive (BYK-333 from Byk-Chemie GmbH) and 0.1 g of an antioxidant (commercially available butylhydroxytoluene (BHT)) were added to 100 g of the 30% strength by weight binder dispersion according to Preparation Example 1 and stirred. 5 g of isophoronediamine in 5 g of water were added to this mixture and stirring was effected for 3 minutes at 300 rpm. The mixture was allowed to cure as a 100 µm thick layer on a polyethylene film at room temperature. After 24 h a dry, clear, nontacky and nonblocking layer was obtained.

Use Example 2

0.25 g of a silicone antifoam (BYK-028 from Byk-Chemie GmbH), 0.5 g of a silicone-based wetting additive (BYK-333 from Byk-Chemie GmbH) and 0.1 g of an antioxidant (commercially available butylhydroxytoluene (BHT)) were added to 100 g of the 30% strength by weight binder dispersion according to Preparation Example 2 and stirred. 2 g of diethylenetriamine and 3 g of Jeffamine D-148 in 5 g of water were added to this mixture and stirring was effected for 3 minutes at 300 rpm. The mixture was allowed to cure as a 100 µm thick layer on a polyethylene film at room temperature. After 24 h a dry, clear, nontacky and nonblocking layer was obtained.

Use Example 3

0.25 g of a silicone antifoam (BYK-028 from Byk-Chemie GmbH), 0.5 g of a silicone-based wetting additive (BYK-333 from Byk-Chemie GmbH) and 0.1 g of an antioxidant (commercially available butylhydroxytoluene (BHT)) were added to 100 g of the 30% strength by weight binder dispersion according to Preparation Example 1 and stirred. 2 g of diethylenetriamine and 3 g of isophoronediamine in 5 g of water were added to this mixture and stirring was effected for 3 minutes at 300 rpm. The mixture was allowed to cure as a 100 µm thick layer on a polyethylene film at room temperature. After 24 h a dry, clear, nontacky and nonblocking layer was obtained.

The invention claimed is:

1. A water-dispersible, cyclocarbonate-functionalized vinyl copolymer binder having structural groups derived from
   i) at least one vinyl monomer (I) having at least one cyclic carbonate group,
   ii) at least one vinyl monomer (II) having at least one emulsifier group and
   iii) optionally at least one copolymerizable vinyl monomer (III), which differs from the monomers (I) and (II),
   wherein the vinyl monomer (I) is

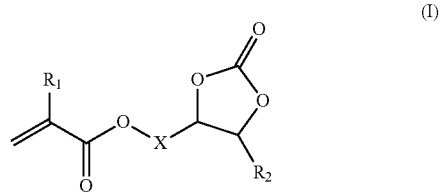

in which
$R_1$ is H or $CH_3$;
$R_2$ is H, alkyl, aryl, aralkyl or alkaryl; and
X is alkylene, arylene, aralkylene or alkarylene,
and the vinyl monomer (II) is a compound of the formula (IV):

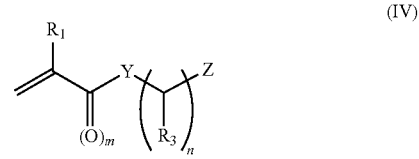

in which
$R_1$ is H or $CH_3$;
$R_3$ is H or alkyl;
Y is O, $CH_2$, $CH_2O$, NH or $CH_2NH$;
Z is $SO_3^{(-)}$ or $N(CH_3)_3^{(-)}$;
m is 1; and
n is 0 to 10.

2. The binder according to claim 1, wherein the monomer (I) has a molecular weight of 172 to 1500.

3. The binder according to claim 1, wherein the copolymerizable vinyl monomer (III) is selected from conjugated dienes, vinylaromatics, vinyl halides, vinyl esters, vinyl ethers, heterocyclic vinyl compounds, (meth)acrylates, (meth)acrylic acid, (meth)acrylamide, (meth)acrylonitrile, esters of monoethylenically unsaturated dicarboxylic acids or mixtures thereof.

4. The binder according to claim 3, wherein the monomer (III) has a molecular weight of 42 to 1000.

5. The binder according to claim 1, having an average molecular weight (Mn) of 260 to 2,000,000.

6. The binder according to claim 1 having structural groups derived from
3 to 96 mol % of monomer (I),
3 to 96 mol % of monomer (II) and
0 to 96 mol % of monomer (III).

7. The binder according to claim 1, wherein substantially no carboxylate groups are present in the binder.

8. The binder according to claim 1, wherein the monomers (II) and (III) contain substantially no groups reactive with cyclic carbonate groups.

9. A process for the preparation of the binder according to claim 1, wherein the monomers (I), (II) and optionally (III) are subjected to free radical copolymerization.

10. The process according to claim 9, wherein the polymerization is effected by adding a mixture of the monomers, optionally together with a free radical initiator, dropwise to a boiling solvent, whereupon the solvent is distilled off, the binder obtained is transferred to the aqueous phase and ionizable emulsifier groups are converted into the ionic form.

11. The process according to claim 9, wherein the polymerization takes place by direct copolymerization in water of a mixture of the monomers, optionally together with a water-soluble free-radical initiator.

12. An aqueous dispersion comprising at least one binder according to claim 1 and water.

13. The aqueous dispersion according to claim 12, having a solids content of at least 10% by weight.

14. A system comprising at least one binder according to claim 1, water and at least one curing agent and optionally catalysts, additives and/or auxiliaries.

15. The system according to claim 14, wherein the system is a two-component system, optionally having a curing component separated from the other components.

16. The system according to claim 14, wherein the curing agent is an amine having at least one $HNR_3R_4$ group, in which $R_3$ and $R_4$, independently of one another, are H, aliphatic, aromatic, aliphatic-aromatic, cycloaliphatic or heterocyclic groups, $C_{1-8}$-alkyl, $C_{6-14}$-aryl, $C_{7-20}$-aralkyl, $C_{7-20}$-alkaryl, or $C_{5-8}$-cycloalkyl, in which $R_3$ and $R_4$ are not simultaneously H, and $R_3$ and $R_4$ together may form a cycloaliphatic system, or a 5-8-membered cycloaliphatic ring.

17. The system according to claim 16, wherein the ratio of the cyclic carbonate groups to the $HNR_3R_4$ groups is 20:1 to 0.2:1.

18. The system according to claim 16, wherein the amine is monofunctional, difunctional or polyfunctional and selected from alkylamines, arylamines, aralkylamines, alkarylamines, cycloalkylamines, alkylenediamines, cycloalkylenediamines, amino functionalized polyalkylene glycols, polyamines, polyimines, polyamides, polyaminoamides, polyurethanes, polyvinylamines or mixtures thereof.

19. The system according to claim 14, wherein a catalytically active amount of a base is present as a catalyst.

20. The system according to claim 14, wherein additives used are salts, magnesium chloride, calcium chloride, calcium sulphate, barium sulphate; anhydrite, gypsum, chalk; oxides, silica, alumina; hydroxides, magnesium hydroxide, aluminium hydroxide; coloured pigments, titanium dioxide, iron oxide; carbon, carbon black, graphite, exfoliated graphite; metal pigments, aluminium; water-absorbing fillers, cement; aluminosilicates, talc, and/or kaolin; and auxiliaries used are plasticizers, stabilizers, UV absorbers, antioxidants, antifoams, and/or wetting additives.

21. The binder according to claim 1, wherein $R_2$ is H, $C_{1-8}$-alkyl, $C_{6-14}$-aryl, $C_{7-20}$-aralkyl or $C_{7-20}$-alkaryl.

22. The binder according to claim 1, wherein X is alkylene, arylene, aralkylene or alkarylene, which optionally contain (poly)ester, (poly)ether, (poly)amide, (poly)urethane and/or (poly)carbonate groups; $C_{1-8}$-alkylene or methylene.

23. The binder according to claim 1, wherein the copolymerizable vinyl monomer (III) is selected from $C_{1-8}$-alkyl (meth)acrylates, $C_{6-14}$-aryl (meth)acrylates, $C_{7-20}$-aralkyl (meth)acrylates or styrene.

24. The binder according to claim 1, wherein not more than 5 mol % of carboxylate groups are present in the binder.

25. The binder according to claim 1, wherein the monomers (II) and (III) contain not more than 5 mol % of reactive groups with cyclic carbonate groups.

* * * * *